H. E. MARSHALL.
CLUTCH.
APPLICATION FILED JUNE 30, 1908. RENEWED MAY 29, 1909.

945,565.

Patented Jan. 4, 1910.

Witnesses:
Chas. D. King
Victor D. Borst

Inventor:
Herbert E. Marshall
by Henry D. Williams
Attorney.

UNITED STATES PATENT OFFICE.

HERBERT E. MARSHALL, OF NEW YORK, N. Y., ASSIGNOR TO HENRY W. AYLWARD, OF BROOKLYN, NEW YORK.

CLUTCH.

945,565.  Specification of Letters Patent.  Patented Jan. 4, 1910.

Application filed June 30, 1908, Serial No. 441,183.  Renewed May 29, 1909.  Serial No. 499,099.

*To all whom it may concern:*

Be it known that I, HERBERT E. MARSHALL, a citizen of the United States, residing at the borough of Brooklyn, city of New York, in the county of Kings and State of New York, have invented a certain new and useful Improvement in Clutches, of which the following is a specification, reference being had therein to the accompanying drawings, forming part thereof.

My invention relates to releasable power-transmitting devices or clutches, and particularly to that class of clutches in which, when the connection has been made between the driving mechanism and the part to be driven, this connection is retained during a definite movement, such as one revolution of the driving mechanism, and is automatically released. While this clutch may be used to advantage in connection with any machine on which this class of clutches is generally used, it is particularly applicable to my bottle-capping machine, application for Letters Patent for which is filed simultaneously herewith under Serial Number 441,182. Clutches of this class in general use are commonly so constructed that, after the clutch has been thrown in and connection made with the driving mechanism by the operation of some device under the control of the operator, as a treadle, this device must be released before the connection will be automatically released; and operators are frequently injured as a result of carelessness in this respect.

The object of my invention is to obviate this difficulty by providing a clutch which will automatically disconnect independently of the operator, and one in which the connection can be made again only by the conscious act of the operator.

My invention also has for its objects simplicity of construction and increased effectiveness and reliability.

Other objects and advantages will appear from the following description.

I shall now describe the means embodying my invention which are illustrated in the accompanying drawings and shall thereafter point out my invention in claims.

Figure 1:
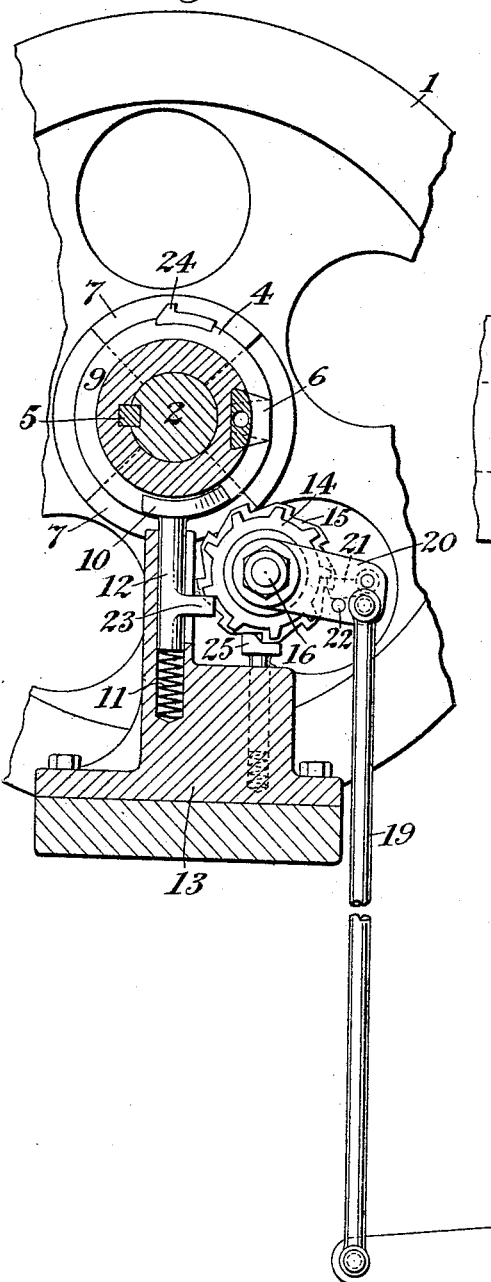
Figure 2:
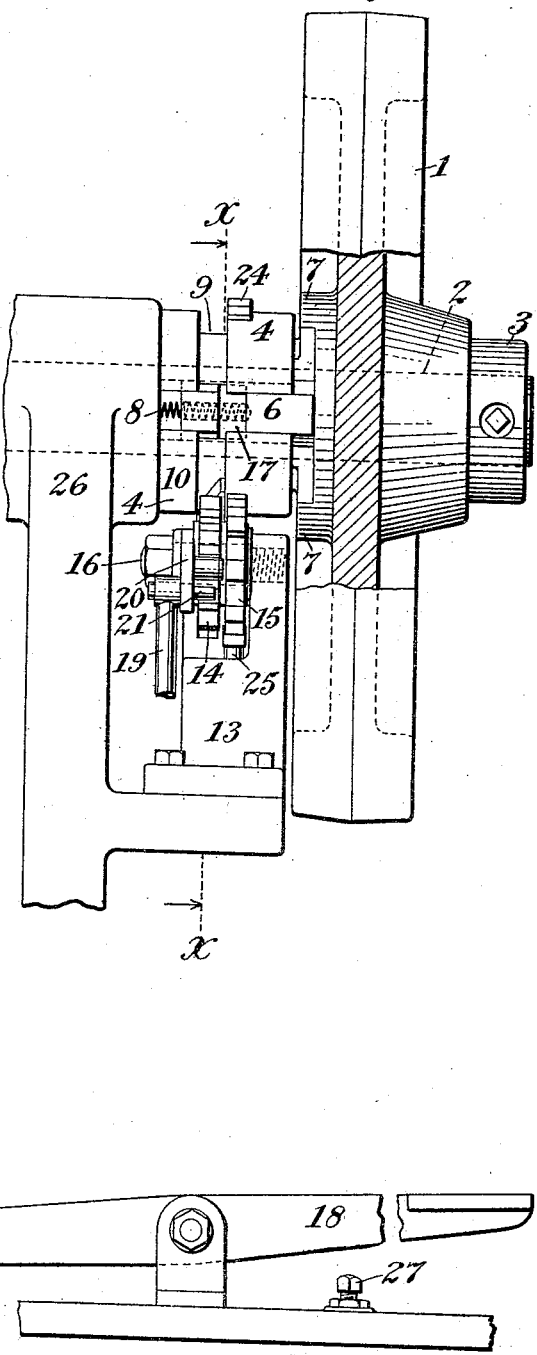

Figure 1 is a sectional elevation on the line *x—x* of Fig. 2, looking toward the right. Fig. 2 is a front elevation, partly in section, showing the connections.

The driving wheel or pulley 1 turns loosely on the shaft 2 between a retaining collar 3 and a clutch collar 4. The collar 4 is fixed or keyed on the shaft 2 by a key 5, shown in Fig. 1. A clutch member or sliding bolt 6 slides laterally in a groove in the collar 4 as shown, and is normally held in contact with wings or lugs 7 on the hub of the pulley 1 by a thrust spring 8, and in this position compels the shaft to rotate with the driving wheel. The collar 4 is provided with an annular groove 9, in which a trigger or wedge member 10 is normally held by a spring 11, pressing against an arm 12, which slides vertically in a standard 13, as shown in Fig. 1. The sliding bolt 6 is provided with a groove 17 corresponding to the groove 9 in the collar 4. As the collar 4 is rotated, the wedge member 10 enters the groove 17 and presses back the sliding bolt 6 from engagement with the wings on the hub of the pulley 1, against the tension of the spring 8.

Two ratchet wheels 14 and 15 are keyed on a stud 16 of the standard 13 in such a way that the teeth of one are slightly in advance of the teeth of the other for a purpose which will appear hereafter. The treadle 18 is also connected loosely to the stud 16 by a link 19 and a connecting plate 20. Pivoted to the plate 20 is a pawl 21, held against downward pressure by a pin 22, and so positioned that when the treadle is pressed down and the link thereby raised, the pawl will engage and actuate the ratchet wheel 14. The adjustable stop 27 is provided for the treadle 18.

The arm 12 of the wedge member 10 is provided with a finger 23 positioned so as to be engaged by the teeth of the ratchet wheel 14 when this ratchet wheel is actuated by the operation of the treadle, and so as to be pressed down thereby, thus pressing down the wedge member 10 against the tension of the spring 11, until the wedge member is out of the path of the sliding bolt 6, so that the bolt 6 will enter into engagement with the driving wheel 1.

The collar 4 is provided with a tooth 24 which engages the ratchet wheel 15 as the collar 4 is rotated, and causes the ratchet wheel 15 to rotate, thus rotating also the ratchet wheel 14 so as to release the finger 23 and allow the wedge member 10 to be forced back by the spring 11 to its original position in the groove 9. This operation will be more fully described hereinafter.

A spring-actuated locating pin 25 is held in the standard 13 and is placed so as to arrest the ratchet wheels by engagement with the ratchet wheel 15, after this ratchet wheel 15 has been actuated by the tooth 24, and to arrest the ratchet wheel in proper position for the next operation.

The supporting frame 26 has a bearing for the shaft and has a projecting shelf to which the standard 13 is bolted.

In operation, assuming the device to be in the position shown in the drawings, when the power is applied to the pulley 1, since the sliding bolt 6 is in engagement with the pulley, the collar 4 and shaft 2 will be revolved with the pulley until the sliding bolt reaches the wedge 10. Then the wedge 10 will enter the groove 17 and force back the bolt from engagement with the pulley, and this connection being broken, the collar and shaft will be no longer propelled by the pulley and will immediately stop. In order to make the connection again, the operator presses down the treadle with his foot, and the pawl 21 engages a tooth in the ratchet wheel 14 as previously described and causes the wheel to rotate, thereby pressing down the finger 23 and hence the wedge member 10 from the groove 17 in the sliding bolt 6, thus releasing the sliding bolt and allowing it to be forced by the spring 8 into engagement again with the pulley hub. Immediately it is engaged by the wings or lugs 7 and the collar and hence the shaft are caused to rotate. But the ratchet wheel 14 in its rotation by the treadle 18 is stopped by the locating pin 25 in such a position that the tooth which engages the finger 23 is brought near to the edge of the finger, so that but a very slight further rotation is needed to release the tooth from the finger and allow the wedge member 10 to slip back into place. This further rotation is produced by the tooth 24 engaging a tooth of the ratchet wheel 15 as the collar 4 is revolved, and the finger 23 is released and the spring 11 pushes the wedge 10 back into the groove 9 and the wedge again engages in the groove of the sliding bolt 6 and pulls the bolt out of engagement with the pulley, and the collar and shaft at once cease to rotate. The locating pin 25 meanwhile, by its position and shape, has caused the ratchet wheels to stop in such a position that the tooth of the ratchet wheel 14 again engages the finger 23, as shown in Fig. 1, and is again ready to repeat the operation as described. It is apparent that the sliding bolt will be held by the wedge member 10 indefinitely out of engagement with the pulley, no matter whether the treadle is released or not, and that the only way that the connection can be formed again and the shaft made to perform another revolution, is to release the sliding bolt by pressing down the wedge 10, and to do that the treadle must be released and then pressed down again; or, in other words, the treadle must be pressed down for every revolution of the shaft. Thus the greatest safeguard against injury is afforded, while, at the same time, a simple and efficient device is provided with all the advantages of the ordinary clutch.

It is obvious that various modifications may be made in the construction shown and above particularly described within the principles and scope of my invention.

I claim:

1. In combination with a driving mechanism, a clutch member having a tendency to engage the driving mechanism, a disengaging member operative to disengage the clutch member from the driving mechanism and to hold the clutch member thus disengaged, a device movable by the operator for moving the disengaging member out of operative position, and means operating independently of the operator for moving said device farther in the same direction and releasing the disengaging member and allowing it to return to operative position after a predetermined movement of the driving mechanism.

2. In combination with a driving mechanism, a clutch mechanism including a sliding bolt adapted to engage the driving mechanism and means tending to move it into engagement therewith, a wedge member operative to withdraw the sliding bolt from engagement with the driving mechanism, a ratchet wheel rotatable by the operator for moving the wedge member out of operative position, and automatic means operating independently of the operator for returning the wedge member to operative position.

3. In combination with a driving shaft and a drive wheel mounted loosely thereon, a clutch mechanism comprising a collar mounted to rotate with the shaft, a sliding bolt in the collar adapted to engage the drive wheel and means tending to move it into engagement therewith, a wedge member operative to withdraw the sliding bolt from engagement with the drive wheel, a ratchet wheel rotatable by the operator for moving the wedge member out of operative position, and automatic means operating independently of the operator for returning the wedge member to operative position.

4. In combination with a driving shaft and a drive wheel mounted loosely thereon, a clutch mechanism comprising a collar provided with an annular groove and mounted to rotate with the shaft, a sliding bolt in the collar having a groove corresponding to the annular groove of the collar and adapted to engage the drive wheel and means tending to move it into engagement therewith, a wedge member adapted to enter the groove of the sliding bolt and withdraw the sliding bolt from engagement with the drive wheel, a ratchet wheel rotatable by the operator for moving the wedge member out of operative position, and automatic means operating independently of the operator for returning the wedge member to operative position.

5. A clutch mechanism comprising a driving shaft, a collar mounted to rotate therewith and a drive wheel mounted loosely thereon, a sliding member in the collar adapted to engage the drive wheel and means tending to move it into engagement therewith, a wedge member for withdrawing the sliding member from engagement with the drive wheel and means tending to move it into operative position, a ratchet wheel rotatable by the operator for withdrawing the wedge member and releasing the sliding member, and means operating independently of the operator for rotating the ratchet wheel farther and releasing the wedge member and allowing it to return to its operative position.

6. A clutch mechanism comprising a driving shaft, a collar mounted to rotate therewith and a drive wheel mounted loosely thereon, a sliding member in the collar adapted to engage the drive wheel and means tending to move it into engagement therewith, a wedge member for withdrawing the sliding member from engagement with the drive wheel and means tending to move it into operative position, a ratchet wheel rotatable by the operator for withdrawing the wedge member and releasing the sliding member, means operating independently of the operator for rotating the ratchet wheel farther and releasing the wedge member and allowing it to return to its operative position with every revolution of the shaft, and a locating pin for stopping the ratchet wheel in desired position.

7. A clutch mechanism comprising a driving shaft, a collar mounted to rotate therewith and a drive wheel mounted loosely thereon, a sliding member in the collar adapted to engage the drive wheel and means tending to move it into engagement therewith, a wedge member for withdrawing the sliding member from engagement with the drive wheel and means tending to move it into operative position, a ratchet wheel rotatable by the operator for withdrawing the wedge member and releasing the sliding member, a second ratchet wheel mounted to rotate with the first, means on the collar operating independently of the operator for engaging the second ratchet wheel and causing it to rotate, thus rotating the first ratchet wheel and releasing the wedge member and allowing it to return to operative position with every revolution of the shaft, and a locating pin for stopping the ratchet wheels in desired position.

8. In combination with a driving mechanism, a clutch member having a tendency to engage the driving mechanism, a disengaging member operative to disengage the clutch member from the driving mechanism and to hold the clutch member thus disengaged, a device controllable by the operator for moving the disengaging member out of operative position, and means operating independently of the operator for moving the disengaging member farther in the same direction and thereby releasing the disengaging member and allowing it to return to operative position after a predetermined movement of the driving mechanism.

9. A clutch mechanism comprising a driving shaft, a collar mounted to rotate therewith and a drive wheel mounted loosely thereon, a sliding member in the collar adapted to engage the drive wheel and means tending to move it into engagement therewith, a wedge member for withdrawing the sliding member from engagement with the drive wheel and means tending to move it into operative position, a device movable by the operator for withdrawing the wedge member and releasing the sliding member, and means operating independently of the operator for moving said device farther in the same direction and releasing the wedge member and allowing it to return to its operative position.

In testimony whereof I have affixed my signature in presence of two witnesses.

HERBERT E. MARSHALL.

Witnesses:
VICTOR D. BORST,
WM. ASHLEY KELLY.